United States Patent [19]
Hirose et al.

[11] Patent Number: 5,434,725
[45] Date of Patent: Jul. 18, 1995

[54] MAGNETIC DISC DRIVING DEVICE FOR CONTROLLING THE POSITION OF A MAGNETIC HEAD RELATIVE TO THE DISC

[76] Inventors: Toshihiko Hirose; Takayasu Muto, both of c/o Sony Corporation, 7-35, Kitashinagawa 6-chome, Shinagawa-Ku, Tokyo, Japan

[21] Appl. No.: 85,613

[22] Filed: Jun. 30, 1993

[30] Foreign Application Priority Data

Jul. 2, 1992 [JP] Japan .................................. 4-197421

[51] Int. Cl.6 ............................................. G11B 5/596
[52] U.S. Cl. .................. 360/77.04; 360/77.02; 360/77.06; 360/78.04; 360/38.1
[58] Field of Search ............... 360/77.02, 77.04, 77.08, 360/77.07, 73.03, 38.1, 53, 77.13, 78.01, 78.04, 78.05, 51, 135, 65; 363/54, 58, 55, 60, 44.32

[56] References Cited

U.S. PATENT DOCUMENTS

| | | | |
|---|---|---|---|
| 4,423,498 | 12/1983 | Kimura et al. | 360/74.4 |
| 4,642,562 | 2/1987 | Collins et al. | 360/77.01 |
| 4,669,004 | 5/1987 | Moon et al. | 360/73.03 |
| 4,742,507 | 5/1988 | Kuroki et al. | 369/54 |
| 5,268,803 | 12/1993 | Sugita et al. | 360/77.08 |

*Primary Examiner*—Georgia Y. Epps
*Assistant Examiner*—Muhammad N. Edun
*Attorney, Agent, or Firm*—Limbach & Limbach

[57] ABSTRACT

A magnetic disc driving device is operated in such a manner that frequency signals recorded in an in-phase relation in servo regions of a magnetic disc of a sector servo system aligned in the radial direction of the disc are reproduced by a read pulse generating unit to produce read pulses. The read pulses are counted by a counter unit, a counting output of which is compared by a comparator to a predetermined value to detect, a dropout in servo patterns on the magnetic disc. Servo signals are produced by a controlling unit from the servo regions of sectors excluding defective sectors for which the counting outputs less than the predetermined value are produced, and a servo control operation is performed based on the resulting servo signals for achieving highly accurate control of the magnetic head position.

7 Claims, 6 Drawing Sheets

MAGNETIC DISC DRIVING DEVICE FOR CONTROLLING THE POSITION OF A MAGNETIC HEAD RELATIVE TO THE DISC

BACKGROUND OF THE INVENTION

1. Field of the Invention

This invention relates to a magnetic disc driving device for rotationally driving a disc on which servo signals are recorded in an integer number of sectors formed by dividing each track on the disc along the track direction. More particularly, it relates to a magnetic disc driving device for controlling the position relative to the disc of a magnetic head recording and/or reproducing information signals on or from the disc, using the servo signals recorded on the disc.

2. Description of the Related Art

With a sector servo system magnetic disc in which servo signals are recorded in sectors formed by dividing the track on the disc by an integer number and which is driven in accordance with a servo control system, a sector servo pattern SSP is arrayed at a leading part of each sector. Thus the sector servo patterns and data regions are alternately arrayed on the magnetic disc.

Figure 1:
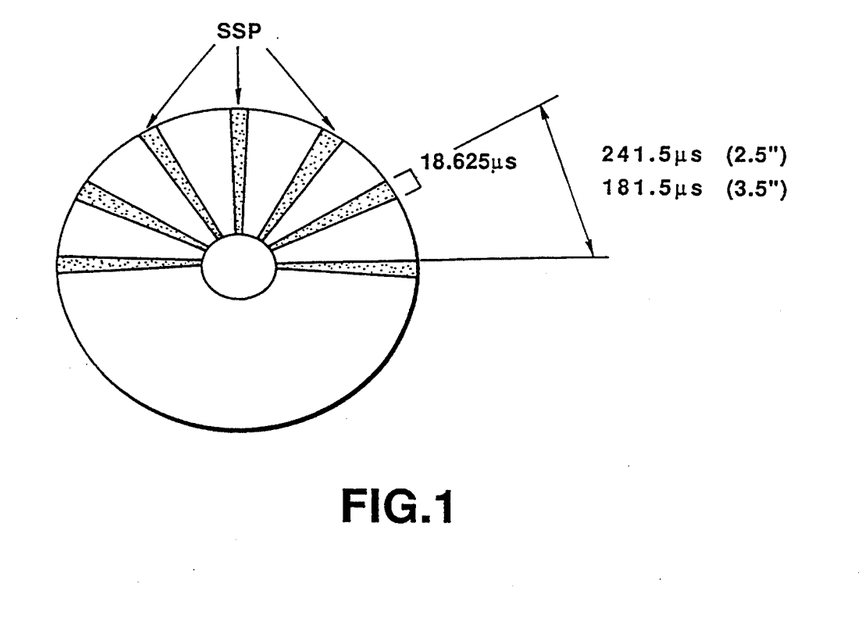
FIG. 1 is a schematic view for illustrating a magnetic head divided into plural sectors along the track direction.

With a magnetic disc having a diameter of 2.5 inches, as shown in FIG. 1, the entire disc surface is divided into 71 sectors, with each sector being 241.5 μs long. With a magnetic disc having a diameter of 3.5 inches, the magnetic disc surface is divided into 90 sectors, with each sector being 181.5 μs long. The servo pattern SSP is recorded in a leading region of each sector within a range of 18.625 μs from the leading end position.

Figure 2:
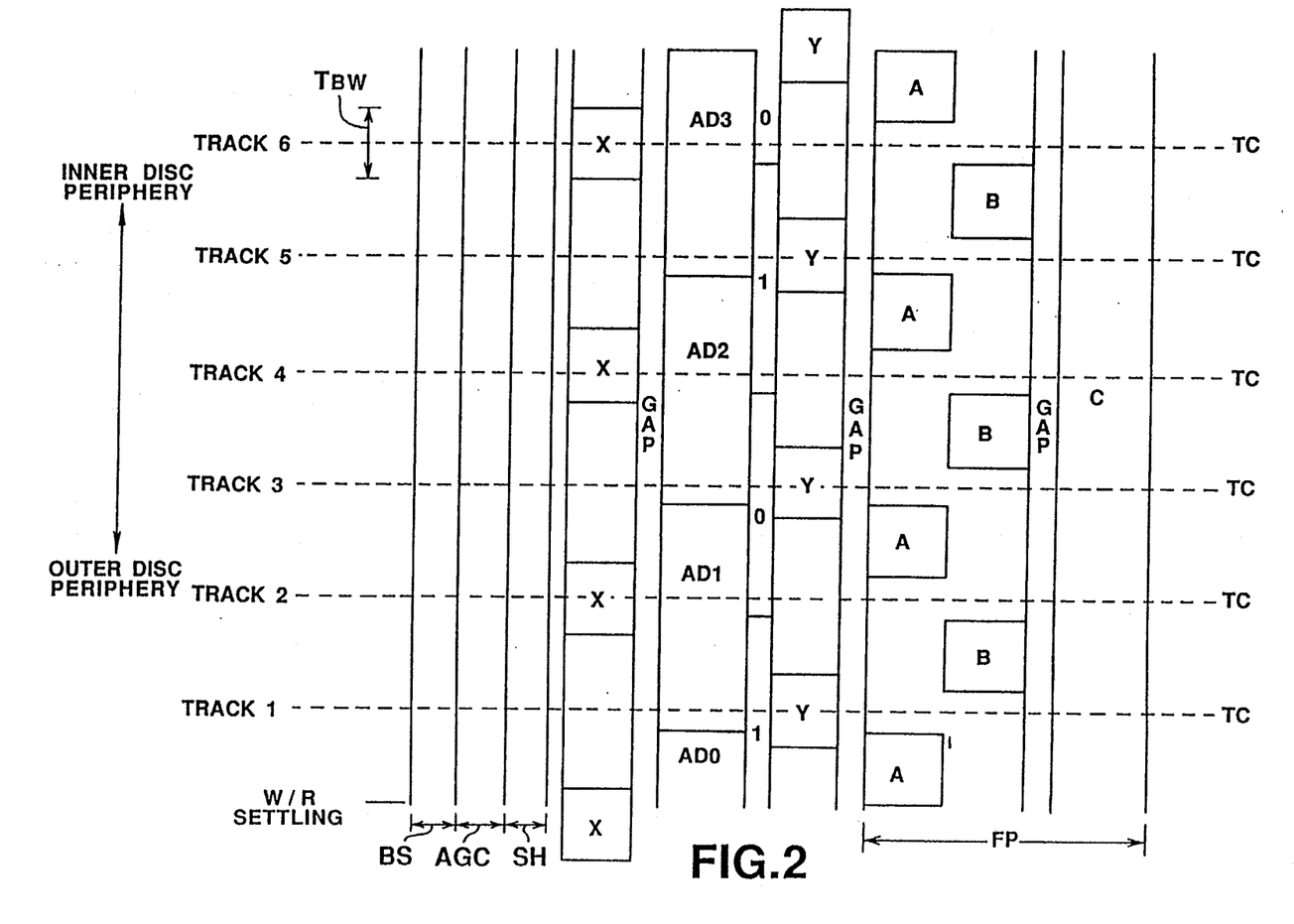
FIG. 2 is various sector servo pattern signals for the magnetic disc shown in FIG. 1.

A typical example of the sector servo pattern is explained by referring to a schematic view of FIG. 2. The sector servo pattern is the pattern as proposed by the present Applicant in JP Patent Application No. 3-32084.

That is, in the sector servo pattern shown in FIG. 2, predetermined reference signals, such as pre-burst signals BS, reference signals AGC for signal level compensation and synchronizing signals SYNC, for example, are recorded in the wake of a write/read (W/R) settling region. Among the Servo pattern signals, the synchronizing signals SYNC include servo header data SH, clocks CLK and pattern sync data PAT SYNC.

In addition, first burst signals X, each recorded with a recording track width $T_{BW}$ so that its track center TC is coincident with even-numbered tracks 2, 4, 6, ..., and second burst signals Y, each recorded with a recording track width $T_{BW}$ so that its track center TC is coincident with odd-numbered tracks 1, 3, 5, .... Besides, first address data AD0, AD1, AD2, ... are arrayed for every two tracks so that their values are changed in the vicinity of the track centers TC of the even-numbered tracks as sector pattern data. Similarly, second address data D0, D1, D2, ... are arrayed for every two tracks so that their values are changed in the vicinity of the track centers TC of the odd-numbered tracks as sector pattern data.

The magnetic disc driving device detects the address desired to be found from the results of comparison of the first level detection signals X and the second level detection signals Y and compensates the detected address by the second address data to detect the magnetic head position relative to the magnetic disc.

Furthermore, tracking control burst servo signals A and B of the sector servo pattern signals are recorded on the magnetic disc in a checkerboard pattern so that the signals A and B are arrayed at right angles to the tracks and in a staggered relation to each other as shown. Finally, third burst servo signals C as the predetermined reference signals are recorded at a predetermined frequency. The burst signals A, B and C make up fine pattern signals FP. The sector servo pattern on the magnetic disc is formed by pre-recording all of the above-mentioned signals.

The header data of the magnetic disc is a header having a width $T_W$ as shown in FIG. 2 and is employed for servo control by scanning the sector servo pattern for reading tracking control magnetic head position data.

The burst signals A and B making up the fine pattern signals FP are recorded with an offset of one-half the width $T_{BW}$ of the track on the magnetic head relative to the track center of each track and additionally with an offset relative to each other. The signal detected via a magnetic head when the burst signals A and B of the fine pattern signals FP are scanned by the magnetic head has its envelope changed depending on the scanning position of the magnetic head. It is by detecting changes in the envelope signals that the magnetic head driving device detects the deviation of the magnetic head position. In distinction from the servo signals A and B, the third burst signal C, as the fine pattern signal, is recorded for outputting an envelope level which remains perpetually constant in the radial direction. The third burst signal C is used for normalizing the signal level. For finding the position signals of the magnetic head relative to the magnetic disc, the burst signals A, B and C, pre-recorded on the magnetic disc, are read by scanning by the magnetic head for deriving signal levels $V_A$, $V_B$ and $V_C$ from the fine pattern signals A, B and C, and by processing in accordance with an equation $$(V_A - V_B)/V_C$$

In each sector of the magnetic disc, resulting from division of each track into an integer number of sectors, a data region for recording data is arrayed in the wake of the servo pattern region in which there are recorded the aforementioned servo pattern data. Meanwhile, preambles or postambles are occasionally provided in a track of the magnetic disc. The integer number herein means an integer number N of sectors formed by dividing the track region excluding a preamble region and a postamble region.

In general, the magnetic disc driving device for rotationally driving the magnetic disc comprises a spindle motor, a magnetic head at the distal end of a head arm as a part of an actuator, a read/write circuit, a head position detection unit, a memory (RAM), a digital signal processor (DSP), a voice coil motor (VCM) driving circuit and a voice coil motor.

The magnetic disc driving device employs, as position information data for tracking controlling of the magnetic head, the above-mentioned fine pattern data A, B of the sector servo pattern via the magnetic head. The fine pattern data A, B are formed by burst signals which are detected by the magnetic head to find signal levels $V_A$, $V_B$ which in turn are employed as position signals. Meanwhile, the magnetic head position in the magnetic disc driving device is known to be proportional to the difference of two signal levels $(V_A - V_B)$. By taking advantage of this relationship of proportionality, the magnetic disc driving device generates position information signals indicating the position of the magnetic head relative to the magnetic disc.

However, should there be servo pattern data dropout in the fine pattern region within the servo pattern, the position control voltage of the magnetic head, as found from the above-mentioned level difference ($V_A - V_B$), becomes different from the control voltage which is used for moving the magnetic head to a true position. The result is that, with the magnetic head driving device, the control voltage value in case of a data dropout in the fine pattern region becomes different from the voltage value corresponding to the true control position of the magnetic head in case of the absence of data dropout in the fine pattern region. Such voltage difference represents an error in the magnetic head movement control and tends to produce disturbances in the movement control of the magnetic head. The result is that, in the worst of the cases, the magnetic disc driving device causes the magnetic head to be deviated off the track being scanned.

SUMMARY OF THE INVENTION

It is an object of the present invention to provide a magnetic disc driving device in which dropout in a servo pattern on the magnetic disc is detected to enable accurate control of the magnetic head position. The magnetic disc driving device detects constant-frequency signals recorded in an in-phase state in a servo region of the sector servo system magnetic disc continuous in the radial direction of the disc by read pulse generating means to generate read pulses which are counted by a counting means. The count output is compared by a comparator means to a predetermined value to produce a defect detection signal indicating the defective sector for which a count output less than the predetermined value has been produced. Servo signals are produced from the servo regions of the sectors excluding the defective sector as indicated by the defect detection signal and, based on the thus produced servo signals, the magnetic head position is controlled by controlling means. In this manner, a highly accurate magnetic head position control may be achieved with the magnetic head driving device.

Other objects and advantages of the present invention will become apparent from the following description of the preferred embodiments and the claims.

BRIEF DESCRIPTION OF THE DRAWINGS

FIGS. 6(a)-6(i) are timing charts for illustrating the control operation for the magnetic disc in the magnetic disc driving device shown in FIG. 3.

DETAILED DESCRIPTION OF PREFERRED EMBODIMENTS

Referring to the drawings, a magnetic driving device according to the present invention is explained in detail.

Figure 3:
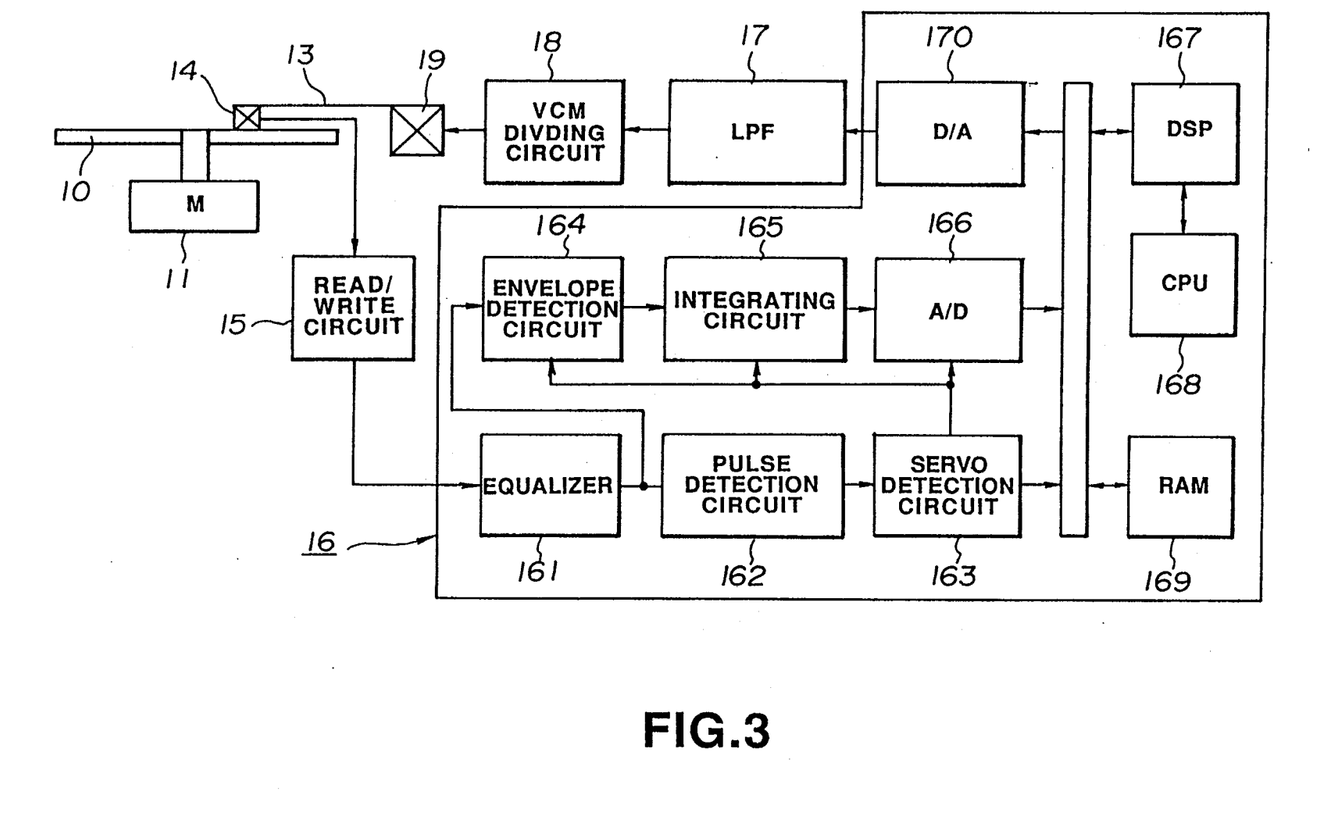
FIG. 3 is a schematic block diagram showing an arrangement of a magnetic disc driving device according to the present invention.

The magnetic disc driving device is arranged as shown for example in FIG. 3.

The magnetic disc driving device according to the present invention is a hard disc device of a sampling-servo system in which data pre-recorded on the magnetic disc is sampled and used for controlling the rotational driving of the magnetic disc. The magnetic disc driving device comprises a magnetic disc 10, a spindle motor 11, a magnetic head arm 13, a magnetic head 14, a read/write circuit 15, a magnetic head position detecting and controlling unit 16, a low-pass filter (LPF) 17, a voice coil motor (VCM) driving circuit 18 and a voice coil motor 19.

The magnetic disc 10 is a magnetic disc of the sector servo system in which servo signals are recorded in each of an integer number of sectors formed by dividing each track on the magnetic disc along the track direction. The sector servo pattern SSP as described with reference to FIG. 2 is arrayed in a servo region provided at a leading portion of each sector. Meanwhile, preambles or postambles are occasionally recorded in a track of the magnetic disc. The integer number herein means an integer number N of sectors formed by dividing the entire region of each track excluding a preamble region and a postamble region.

The magnetic disc 10 is run into rotation by the spindle motor 11 so that each track on the disc is scanned by the magnetic head 14 provided at the distal end of the magnetic head arm 13.

The magnetic head 14 scans the tracks on the magnetic disc 10 for supplying detected signals of the sector servo pattern SSP to the head position detecting controlling unit 16 via read/write circuit 15. The magnetic head position detecting controlling section 16 generates feedback control signals for controlling the position of the magnetic head 14 from the detected signals of the sector servo pattern SSP. The magnetic head position detecting controlling unit 16 transmits the head position control signals via LPF 17 to the VCM driving circuit 18 to control the driving of the voice coil motor 19 to control the position of the magnetic head arm 13 for shifting the magnetic head 14 to the target track position.

The magnetic head position detecting controlling unit 16 comprises an equalizing circuit 161, a pulse detection circuit 163, an envelope detection circuit 164, an integrating circuit 165, an A/D converter 166, a digital signal processor (DSP) 167, a CPU 168, a RAM 169 and a D/A converter 170.

The equalizing circuit 161 equalizes playback signals supplied from the magnetic head 14 via the read/write circuit 15 to transmit the resulting equalized signals to the pulse detection circuit 162 and to the envelope detecting circuit 164.

Figure 4:
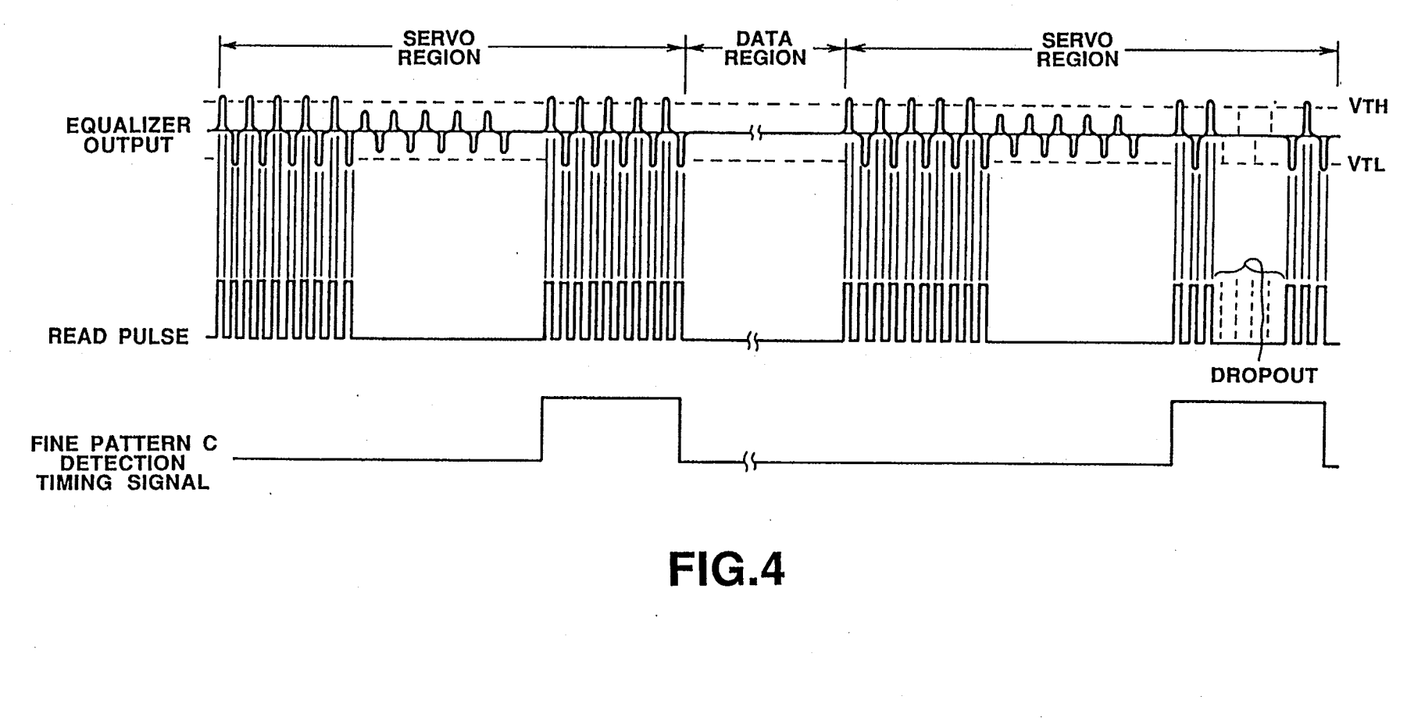
FIG. 4 is a timing chart for illustrating the operation of a servo detection circuit of the magnetic disc driving device shown in FIG. 3.

The pulse detection circuit 162 detects peaks of detected equalized signals from the equalizing circuit 161 by predetermined threshold levels $V_{TH}$, $V_{TL}$ to generate read pulses as shown in FIG. 4. The pulse detection circuit 162 transmits the generated read pulses to the servo detection circuit 163.

The servo detection circuit 163 decides that the read pulse supplied from the pulse detection circuit 162 is the detected servo pattern signals and transmits detection signals indicating the timings of the fine pattern signals A, B and C recorded in the servo region to the integrating circuit 165.

Figure 5:
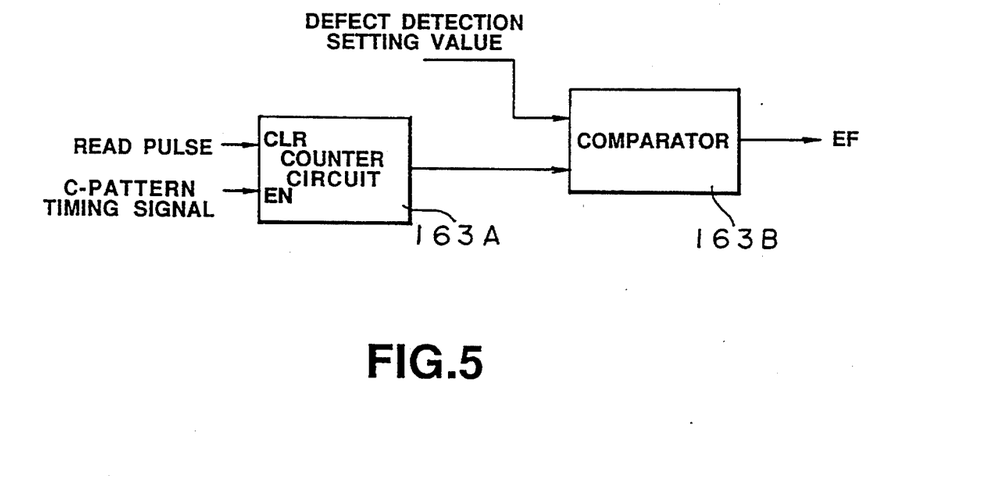
FIG. 5 is a block diagram showing essential parts of the servo detection circuit shown in FIG. 4.

The servo detection circuit 163 comprises a counter circuit 163A for counting the read pulses supplied from the pulse detection circuit 162 and a comparator circuit 163B for comparing the count output to a predetermined value, as shown in FIG. 5.

The counter circuit 163A counts the read pulses during the interval of the fine pattern signals C recorded in the servo region by detection timing signals indicating the period of the fine pattern signals C as shown in FIG. 4. That is, the counter circuit 163A counts the read pulses produced from the detected fine pattern signals C. The comparator 163B compares the count output of the counter circuit 163A to a predetermined value and, should the results of counting by the counter circuit 163A be less than a predetermined number, transmits an error flag EF indicating that the sector is a defective sector to DSP 166.

Figures 6A, 6I:
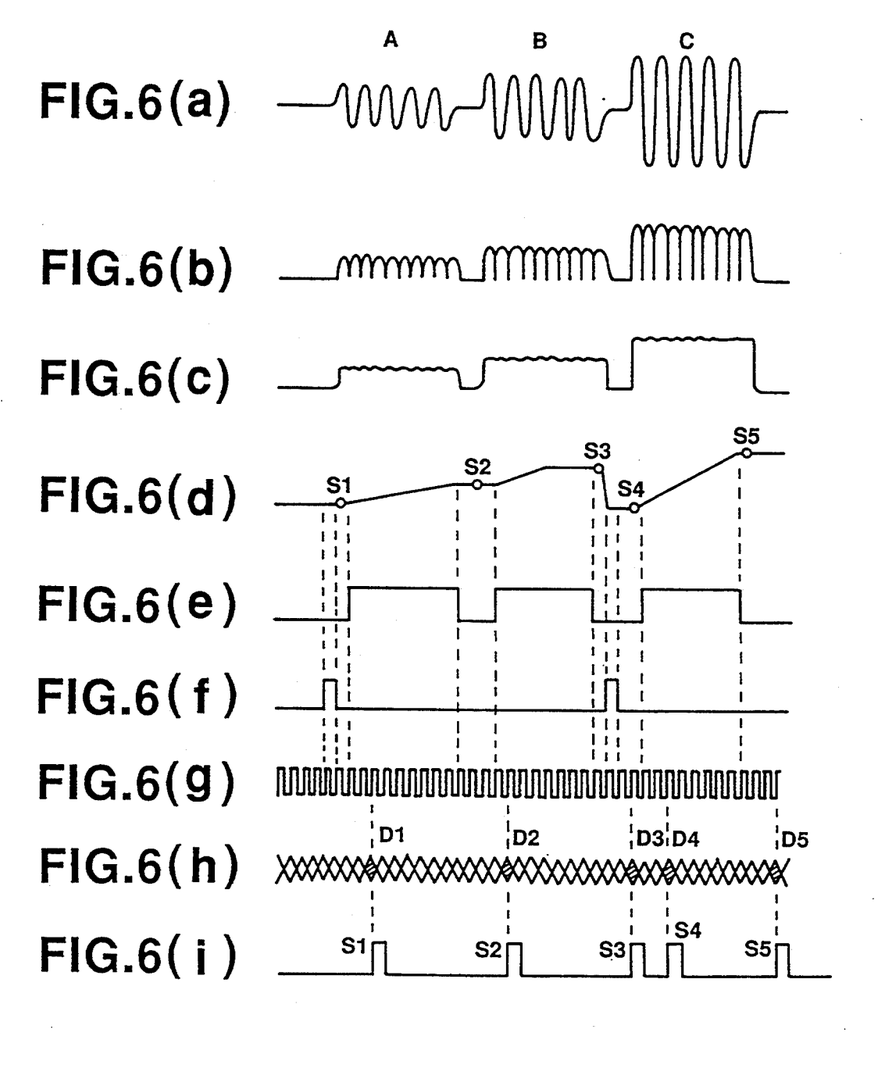

The envelope detection circuit 164 processes equalized playback signals from equalizing circuit 161 with full-wave rectification, followed by envelope detection, as shown in FIGS. 6(a), (b) and (c). The envelope detection signal from the envelope detection circuit 164, as indicated in FIG. 6(c), is transmitted to the integrating circuit 165.

The integrating circuit 165 integrates the detected envelope signal from the envelope detection circuit 164 in accordance with detection timings indicated in FIGS. 6(e) and (f). The detection timings indicate the timings of the fine pattern signals A, B and C in the above-mentioned servo region. The integrated output signals of the integrating circuit 165, as shown at (d) in FIG. 6, are transmitted to the A/D converter 166.

The A/D converter 166 digitizes the integrated output signals from the integrating circuit 165 in synchronism with clocks shown at (g) in FIG. 6 to transmit the resulting signal level data to DSP 167. Based on signal level data of the integrated output signals of the integrating circuit 165, and an error flag EF indicating the defective sector from the servo detecting circuit 16 by "1", DSP 166 generates feedback control data to effect position control of the magnetic head 14 in accordance with the procedure of the flow chart shown in FIG. 7.

Figure 7:
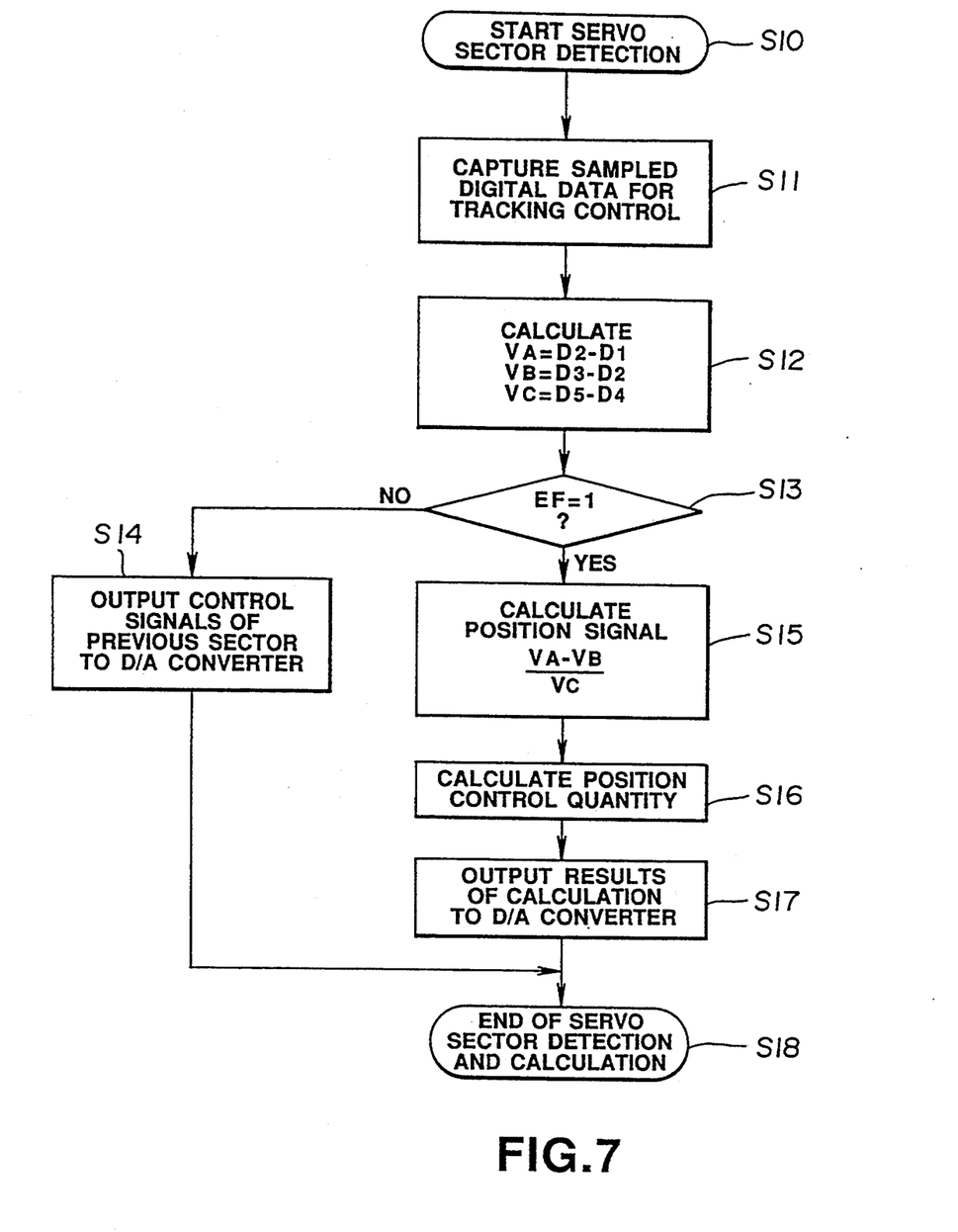
FIG. 7 is a flow chart for illustrating a control operation of the magnetic head position by DSP in the magnetic disc driving device shown in FIG. 3.

Referring to this flow chart, DSP 166 of the magnetic disc driving device starts servo sector detection and processing for the position controlling of the magnetic head 14 at step S10. DSP 166 of the magnetic head driving device then proceeds to step S11.

At step S11, sampling data D1 to D5, as signal information data for burst signals of the three fine patterns A, B and C, shown at (d) in FIG. 6, are captured at sampling points S1 to S5 for effecting tracking control. That is, the sampling data D1 to D5, having the sampling points S1 to S5, are captured at timings of clocks S1 to S5 shown at (i) in FIG. 6, from the above-mentioned signal level data from A/D converter 166, as indicated at (h) in FIG. 6.

At the next step S12, burst signal levels $V_A$, $V_B$ and $V_C$ of the three fine pattern burst signals A, B and C are calculated on the basis of these sampling data D1 to D5 by substitution into the following equations (1) to (3):

$$V_A = D2 - D1 \quad (1)$$

$$V_B = D3 - D2 \quad (2)$$

$$V_C = D5 - D4 \quad (3)$$

DSP 166 of the magnetic driving device then proceeds to step S13.

At step S13, a decision is made, based on the error flag EF, as to whether or not a sector is a defective sector. That is, if the error flag EF is "0", DSP 166 decides that the sector is a normal sector free of defects, and proceeds to step S15. If the error flag EF is "1", DSP 166 gives a decision that the sector is a defective sector the sector servo fine pattern data of which undergoes signal dropout and hence destruction. DSP 166 then proceeds to step S14.

At step S14, control data of the directly previous sector, already outputted to the D/A converter 170, is again outputted responsive to detection of the defective sector. That is, with the defective sector, the magnetic disc driving device gives a decision that signal dropout has been incurred in the fine pattern burst signal data to cause the lowering of the sampling signal levels $V_A$ and/or $V_B$. Thus the magnetic disc driving device employs the control signal data obtained in the servo sector directly preceding the defective data without employing the data sampled from the defective sector.

At step S15, DSP 166 also finds position signals of the magnetic head 14, based on the burst signal levels $V_A$, $V_B$ and $V_C$, in accordance with the formula:

$$(V_A - V_B)/V_C \quad (4)$$

At step S16, a feedback signal for position control is calculated. DSP 166 calculates the compensating servo feedback control signal from the calculated control quantities of the proportional, integrating and differential (PID) operations.

At step S17, a compensating servo feedback control signal for the head position as found at step S16 is outputted to D/A converter 170.

At step S18, the processing operations for sector defect detection and magnetic head position control are terminated.

Meanwhile, since the present routine is executed perpetually, data of step S14 is held until the next sector is detected as normally.

With the above-described arrangement, the error flag EF is detected by the servo detection circuit 163. If the error flag EF is found, the error flag EF "1" is transmitted to DSP 166. On the other hand, control data conforming to the feedback control signal for position control as found out is used for sector servo for effecting magnetic head position control, without employing the position information of the sector suffering from the defect. Thus it is possible with the present magnetic head device to diminish adverse effects due to dropout errors on the servo system operation for avoiding the delay possibly caused by servo control disturbances in detecting the magnetic head position. In this manner, it becomes possible to control the position of the magnetic head accurately and promptly.

Meanwhile, CPU 168 causes data or control signals to be exchanged with DSP 166 which performs calculations for compensating for external pressures exerted on the magnetic head 14 to produce a corrected servo control signals and adds the corrected servo control signals to an output position signal from CPU 168 to transmit the resulting sum signal to D/A converter 170.

The feedback control signal thus produced is supplied from DSP 167 to VCM driving circuit 18 via LPF 17. The VCM driving circuit 18 transmits a driving control signal conforming to the control signal supplied thereto to a voice coil motor 19 to effect position control of the magnetic head.

The servo error due to fine pattern dropout is considered. If it is it is assumed that, for simplicity sake, the detection output from the envelope detection circuit 164 is a sine wave signal, the integrated output $V_1$ per wave from the integrating circuit 165 may be calculated by the following operation:

$$V_1 = \int_0^\pi V_m \cdot \sin\theta \cdot d\theta \qquad (5)$$
$$= V_m \cdot [-\cos\theta]_0^\pi$$
$$= 2V_m$$

From the above equation (5), the integrated output $V_{INT}$ per n fine pattern waves is given by $$V_{INT} = \sum_{i=0}^{n} 2V_m \qquad (6)$$
$$= 2V_m \cdot n$$

If a single fine pattern wave becomes destitute, the integrated output $V_{INT}$ is decreased in level by 1/n. In the present embodiment, peak-holding having a time constant of 625 nsec corresponding to five full-wave rectified waves is carried out by the envelope detection circuit 164 to produce a detected envelope output, so that, if a single wave become destitute with respect to the 12-wave fine pattern data C, the integrated output $V_{INT}$ is decreased in level by 0.2 $V_m$. If the level error of up to 10% lower than the level for the correct data, dropout of up to three waves may be tolerated, as indicated by the relation between the number of dropout waves m, of the fine pattern data C, the integrated output $V_{INT}$ and the level error shown in Table 1:

TABLE

| m | $V_{INT}$ | error[%] |
|---|-----------|----------|
| 1 | 13.8$V_m$ | 98.6 |
| 2 | 13.4$V_m$ | 95.7 |
| 3 | 12.8$V_m$ | 91.4 |
| 4 | 12.0$V_m$ | 85.7 |
| 5 | 11.0$V_m$ | 78.6 |
| 6 | 10.0$V_m$ | 71.4 |
| 7 | 9.0$V_m$ | 64.3 |
| 8 | 8.0$V_m$ | 57.1 |
| 9 | 7.0$V_m$ | 50.0 |
| 10 | 6.0$V_m$ | 42.9 |
| 11 | 5.0$V_m$ | 35.7 |
| 12 | 0.0$V_m$ | 0.0 |

The servo detection circuit 163 sets the error flag EF indicating the defective sector on detecting the dropout of the fine pattern data exceeding the range of the allowable error.

With the magnetic disc driving device of the illustrated embodiment, the constant frequency signal of the fine pattern C, recorded in an in-phase relation in servo regions aligned with one another in the radial direction of the disc 10, is necessarily reproduced when detecting the servo pattern for the magnetic disc 10 for effecting the position control of the magnetic head 14. Consequently, it becomes possible with the magnetic head driving device to produce read pulses from the detected signals to detect the defective sector in a reliable manner. If the defective sector is detected, the magnetic disc driving device makes use of the fine pattern recorded in the normal sector excluding the defective sector to minimize the effects of the defective sector presented in the position control servo as perturbations in such a manner as to realize highly accurate position control of the magnetic head.

Although the constant-frequency signals, recorded in a in-phase relation in the servo regions aligned in the radial direction of the magnetic disc, are used as the fine pattern signal C, and the read pulses are generated by reproducing the fine pattern signals C for detecting the defective sector, the present invention is not limited to this specific embodiment. For example, the defective sector may be detected by producing read pulses from the reference signal AGC used for signal level compensation.

What is claimed is:

1. A magnetic disc driving device for rotationally driving a magnetic disc in which servo signals are recorded in an integer number of sectors formed along a track on said magnetic disc, comprising:

read pulse generating means for reproducing frequency signals recorded in an in-phase relation in the radial direction of the disc for forming read pulses;

counting means for counting the number of the read pulses from said read pulse generating means;

comparator means for comparing a count output of said counting means to a predetermined value and outputting a defect detection signal indicating a defective sector for which a count output less than said predetermined value is produced; and control means for producing a servo signal from the servo region of each sector excluding the defective sector indicated by the defect detection signal from said comparator means for effecting the control of the magnetic head position.

2. The magnetic disc driving device as claimed in claim 1 wherein: said read pulse generating means detects a peak position by comparing a detected equalized frequency signal from equalizing means to a predetermined threshold level.

3. The magnetic disc driving device as claimed in claim 1 wherein: said counting means counts said read pulses during a time interval when the magnetic head reads a third servo signal recorded in the servo region of each sector of the magnetic disc as predetermined reference signals, said third servo signal being among three burst signals recorded in said servo region, said third servo signal being recorded after recording of first and second tracking-control servo signals in a direction at right angles to the track and in a staggered relation to each other.

4. The magnetic disc driving device as claimed in claim 1 wherein: said comparator means output an error flag as an output defect detection signal.

5. The magnetic disc driving device as claimed in claim 1 wherein said controlling means comprises:

envelope detection means for full-wave rectifying detected and pre-equalized signals and detecting the envelope of the rectified signals for finding the compensating feedback control signal supplied for magnetic head positioning;

signal integrating means for integrating signals produced by said envelope detection means;

A/D converting means for converting the signal level of said signal integrating means into digital data;

processing means for generating compensating servo feedback data for position control based on an output of said A/D converting means; and D/A converting means for converting output data of said processing means into analog signals.

6. The magnetic disc driving device as claimed in claim 1 wherein: said controlling means sets an allowable error range level in consideration of the lowering of the integration output level of said signal integrating means and effects comparison of said allowable error range level to said integration output level for detecting the defective sector.

7. A magnetic disc driving device for rotationally driving a magnetic disc in which servo signals are recorded in an integer number of sectors formed along a track on said magnetic disc, comprising:

read pulse generating means for reproducing frequency signals recorded in an in-phase relation in the radial direction of the disc for forming read pulses;

counting means for counting the number of the read pulses from said read pulse generating means;

comparator means for comparing a count output of said counting means to a predetermined value and outputting a defect detection signal indicating a defective sector for which a count output less than said predetermined value is produced;

control means for producing a servo signal from the servo region of each sector excluding the defective sector indicated by the defect detection signal from said comparator means for effecting the control of the magnetic head position;

means for sampling first to third servo signals recorded on said magnetic disc at predetermined sampling points;

means for finding the difference in level of said servo signals obtained from said sampling means, for each of the three servo signals;

means for deciding whether or not a sector is free of defects, based on the possible presence of said error flag;

means for causing data corresponding to the feedback amount of a defect-free sector to be used, depending on the result from the deciding means;

means for outputting a position signal based on the signal level obtained from said sampling means; and means for calculating the compensating servo feedback amount based on the amount of position control from the outputting means.

* * * * *

UNITED STATES PATENT AND TRADEMARK OFFICE
CERTIFICATE OF CORRECTION

PATENT NO. : 5,434,725
DATED : July 18, 1995
INVENTOR(S) : Hirose et al

It is certified that error appears in the above-indentified patent and that said Letters Patent is hereby corrected as shown below:

On the title page; Please add:

--[73] Assignee: Sony Corporation, Tokyo, Japan

Signed and Sealed this

Seventh Day of May, 1996

Attest:

BRUCE LEHMAN

Attesting Officer     Commissioner of Patents and Trademarks